Patented Nov. 16, 1926.

1,606,950

UNITED STATES PATENT OFFICE.

CHARLES EDISON LONG, OF YOUNGSTOWN, OHIO.

FOOD COMPOUND.

No Drawing.   Application filed October 15, 1925. Serial No. 62,595.

My invention relates to food compounds, viz, peanut brittle or peanut confection.

The primary object of my invention is to produce a peanut brittle or peanut confection in which the peanuts are distributed and embedded in the mass and are not exposed on either the top or bottom surface, which surfaces are generally and usually of uniform character, very compact or close texture in the mass, and free from bubbles and air holes, and the mass of the confection, under and between the surfaces, is honeycombed with air holes, spaces or interstices, so that the entire confection, while being firm and crisp, may be readily and easily crushed and chewed.

A further object thereof is to produce a peanut brittle or peanut confection which, having the peanuts embedded in the mass and not exposed on either the top or bottom surface, will absorb the minimum of moisture and will not become damp and stale but will keep fresh and crisp.

A further object is to produce a peanut brittle or peanut confection which, by reason of its composition, has a peanut flavor distributed throughout the entire mass.

To these ends my invention comprises the combination of component ingredients and process of preparation to be hereinafter described and more particularly pointed out in the claims.

My compound comprises, generally, granulated white sugar, corn syrup, water, shelled green peanuts, pulverized peanut brittle which has been formerly made, salt, and baking soda.

In the preparation of my food compound, the sugar and corn syrup and water are placed in a kettle and the mixture rapidly boiled over a fire, until the temperature reaches 232° Fahr., at which time the shelled green peanuts are poured into it. It is then continued to be boiled until the mixture reaches the temperature of 284° Fahr. The mixture is then removed from the fire, the salt is stirred in and immediately the pulverized peanut brittle is rapidly stirred into the mixture. Thereupon, the baking soda is dusted and stirred in, and as soon as this has been accomplished, the mass is then poured on a cooling slab, is spread to a thickness of approximately one-half inch which is done immediately after it leaves the kettle and before the soda acts to "raise" the compound. As soon as the compound is cool enough to handle it is turned on the slab, after which it is not again touched until the surface, which is now on the bottom, has cooled and become tough. When the bottom surface is toughened the mass is stretched until the confection has been reduced to the desired thickness and it is then cooled and broken to pieces as required.

I will now describe the proportions of the several ingredients employed in my food compound to obtain the properties before claimed: The sugar comprises about 32.97 percent; the corn syrup about 21.98 percent; the peanuts about 21.98 percent, the water about 11.448 percent; the pulverized peanut brittle previously made, which provides the element which the soda, in its action, raises to the surface of the mass and thus produces the uniform character and close and compact texture of the surface of the mass, before referred to, comprises about 10.99 percent of the weight of the compound, the soda comprises about 0.572 percent of the weight, and the salt about 1.057 percent (all of which percentages are to be understood as referring to the entire weight of the compound). It will, of course, be understood that the quantity of the confection may be increased or decreased so long as the proportions are maintained, without departing from the scope of the invention.

From the foregoing it will be apparent that the food compound provides a confection which is palatable, the deterioration of which, through dampness, is reduced to a minimum, which contains a peanut brittle flavor throughout the entire mass, and which, by reason of the amalgamation with the other compounds previously referred to of the peanut brittle formerly made in its pulverized state, has provided two uniform, compact surfaces between which is contained a mass of peanut brittle honeycombed with air holes which makes the entire compound easily crushed and chewed.

Having thus described my invention, what I claim as new and desire to be secured by Letters Patent, is:

1. A nut confection consisting of two uniform, compact candy surfaces between which is contained a mass of nut brittle honeycombed with air holes.

2. The herein-described method of making nut brittle which consists in boiling sugar, corn syrup, and water, until the temperature reaches approximately 232° F., then pouring nuts into the mass, then continuing the boiling until the mixture reaches approximately the temperature of 284° F., removing the mixture from the fire and stirring in salt and pulverized nut brittle that has been previously made, then adding baking soda and finally cooling the mass.

3. The herein-described method of making nut brittle which consists in boiling sugar, corn syrup, and water, until the temperature reaches approximately 232° F., then pouring nuts into the mass, then continuing the boiling until the mixture reaches approximately the temperature of 284° F., removing the mixture from the fire and stirring in salt and pulverized nut brittle that has been previously made, then adding baking soda and finally cooling the mass by pouring the same on a cooling slab, spreading to a thickness of approximately one-half inch before the soda acts to "raise" the compound, and subsequently when the compound is cool enough to handle turning it on the slab and after it has been cooled and when the bottom surface is sufficiently tough, stretching the mass until the confection has been reduced to the desired thickness.

In testimony whereof I hereunto affix my signature.

CHARLES EDISON LONG.